United States Patent [19]

King et al.

[11] Patent Number: 5,470,005

[45] Date of Patent: Nov. 28, 1995

[54] METHOD OF SHEET PROCESSING USING A TENSION EXCITER

[75] Inventors: Eugene O. King, Monroeville; G. Alfred Teasley, Ross Township, both of Pa.

[73] Assignee: Aluminum Company of America, Pittsburgh, Pa.

[21] Appl. No.: 255,422

[22] Filed: Jun. 8, 1994

Related U.S. Application Data

[63] Continuation-in-part of Ser. No. 904,482, Jun. 25, 1992, abandoned.

[51] Int. Cl.[6] ................................................. B65H 16/00
[52] U.S. Cl. ................................................. 226/1; 242/413
[58] Field of Search .......................... 226/44, 45, 195; 242/417.3, 413, 413.3, 153; 73/159

[56] References Cited

U.S. PATENT DOCUMENTS

| | | | |
|---|---|---|---|
| 3,470,734 | 10/1969 | Agdur et al. | 73/159 X |
| 3,826,132 | 7/1974 | Fetner et al. | 73/159 X |
| 4,708,301 | 11/1987 | Kataoka | 226/44 |
| 4,833,927 | 5/1989 | Park | 73/862.45 |
| 4,991,432 | 2/1991 | Houghton et al. | 73/159 X |
| 4,997,120 | 3/1991 | Tanaka et al. | 226/44 |
| 5,122,963 | 6/1992 | Chen | 73/159 X |
| 5,123,284 | 6/1992 | Edinburgh et al. | 73/159 X |

*Primary Examiner*—Lenard A. Footland
*Assistant Examiner*—Thomas E. Dunn
*Attorney, Agent, or Firm*—Elroy Strickland

[57] ABSTRACT

A method of sensing tension changes in a sheet of material in a processing line, the material having a mass flow balance in the processing line. The method includes using a dancer roll for engaging the sheet and an actuator for mechanically and momentarily introducing changes in the mass flow balance of the sheet. A sensor is provided for detecting sheet tension at a location near that at which the sheet engages the dancer roll and for producing signals indicative of sheet tension. An algorithm is provided for processing the signals in a manner that determines the dynamic relationship between tension variations near the location of the roll and at other locations in the processing line. The signal processing is effective to identify the presence of the magnification of variations in sheet tension so that the causes of such magnification can be identified.

1 Claim, 3 Drawing Sheets

METHOD OF SHEET PROCESSING USING A TENSION EXCITER

This application is a continuation-in-part of U.S. application Ser. No. 07/904,482, filed Jun. 25, 1992 now abandoned.

BACKGROUND OF THE INVENTION

The present invention relates generally to the control of tension variations in a traveling sheet of material, as might occur in a rolling mill or in a leveling apparatus, and particularly to an "exciting means" for directly introducing a variation in the tension of a traveling sheet of material.

Tension in a traveling sheet is a variable that is responsive to changes in processing parameters that cause changes in the quality of the sheet, such as a uniform thickness or gauge and flatness (which is the shape of the sheet across its surface area, including the shape along its length and crosswise of the direction of sheet travel). The sheet itself dynamically connects or couples separate parts of the sheet handling process, such as the individual stands of a multi-stand rolling mill, or between an unwind coil of metal and tension bridles for levelers that remove buckles from the sheet, i.e., variations in sheet tension in one part of a process can confound operations in other parts of the process. For example, tension coupling can contribute to certain types of mill chatter, cyclic process instabilities, and amplification of cyclic variations. Further, variations in sheet tension can effect the deformation processes associated with leveling and rolling operations. By observing the dynamics of the tension process, source causes of tension instability can be identified thereby permitting modifications in equipment and in control processes to eliminate the cause of the problem or at least reduce its effects.

At present there is no means to directly measure the mechanism of dynamic coupling on sheet handling lines. Therefore, it is difficult to assess whether there is significant interaction and amplification of tension variations occurring in a line.

SUMMARY OF THE INVENTION

The present invention is directed to tension sensing and exciter apparatus that can be insertable into a sheet process line. The apparatus converts force variations within a structural housing into sheet tension variations by use of an actuator that vibrates a first roll directly engaging a traveling sheet to momentarily upset the mass flow balance of sheet material in the process line. The motion of the vibrating roll (as constrained by the sheet) induces a dynamic change in sheet tension that, when increasing, accelerates the upstream sheet and decelerates the downstream sheet and, when decreasing, causes the opposite effect. A load cell or other appropriate sensor is located between the roll and the actuator. The cell monitors the force applied to the exciter apparatus at any given moment of time. A second load cell and roll are provided to measure any amplification of tension changes in the sheet that occur through the mass flow of the process, as a continuous mathematical function. The mathematical function relates tension changes in one location of the process to another process location, and includes as parameters of the mass flow relationship (1) the modulus of the sheet material, (2) the inertia of rotation components, (3) the spring rate of an actuator of the exciter apparatus that upsets mass flow balance, and (4) the natural frequency of the processing line.

The second cell and roll can be included within the structure housing the first roll and sensor, as thus far described, or the second roll and cell can be located immediately before or after the first roll and sensor.

THE DRAWINGS

The invention, along with its objectives and advantages, will be better understood from consideration of the following detailed description and the accompanying drawings in which.

Figure 1:
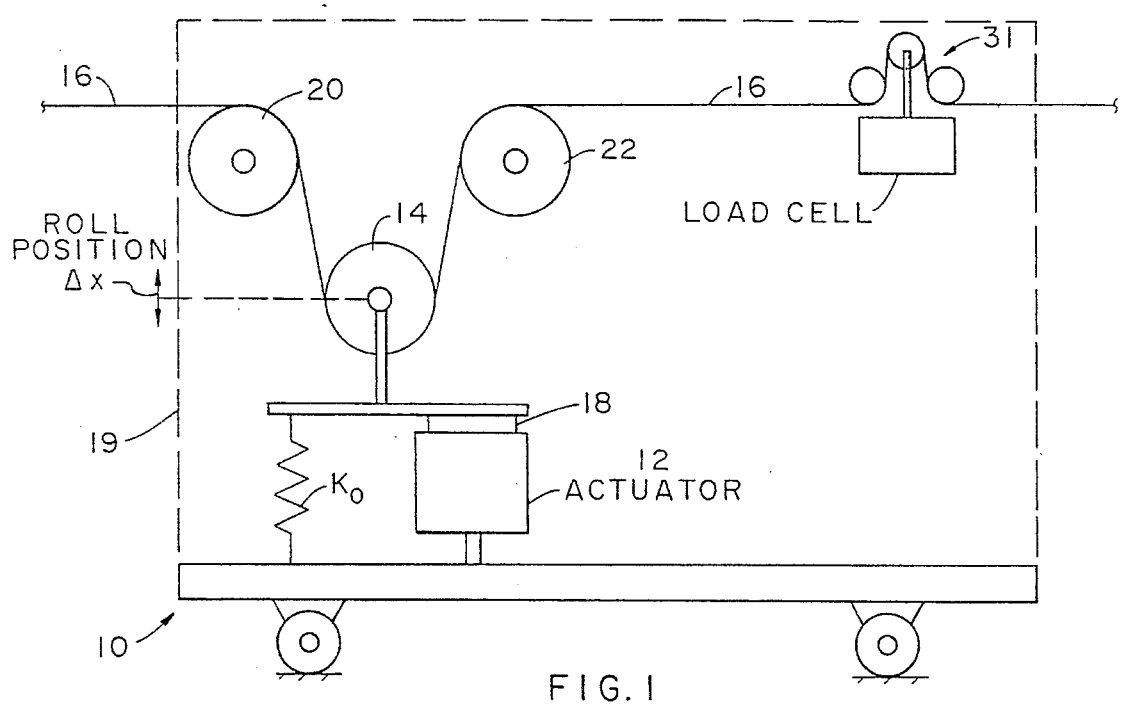
FIG. 1 is a schematic diagram showing certain components of a strip tension exciter and tension sensing means of the invention; the exciter includes a dancer roll while the tension sensing means includes a second roll, both rolls being disposed to engage the sheet.
Figure 6:
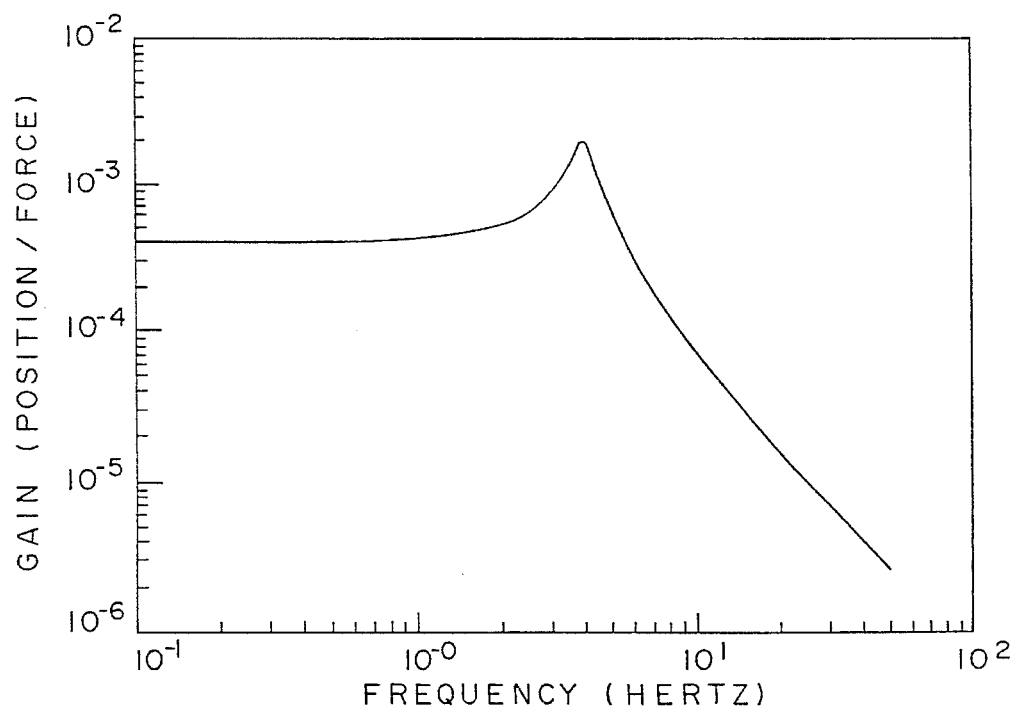
Figure 7:
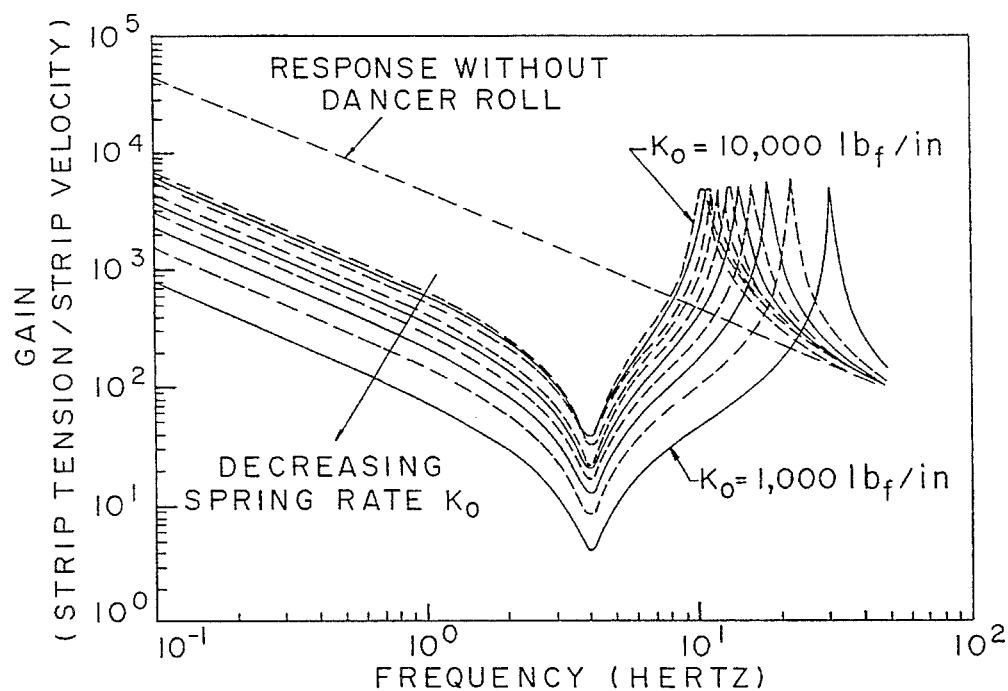
Figure 8:
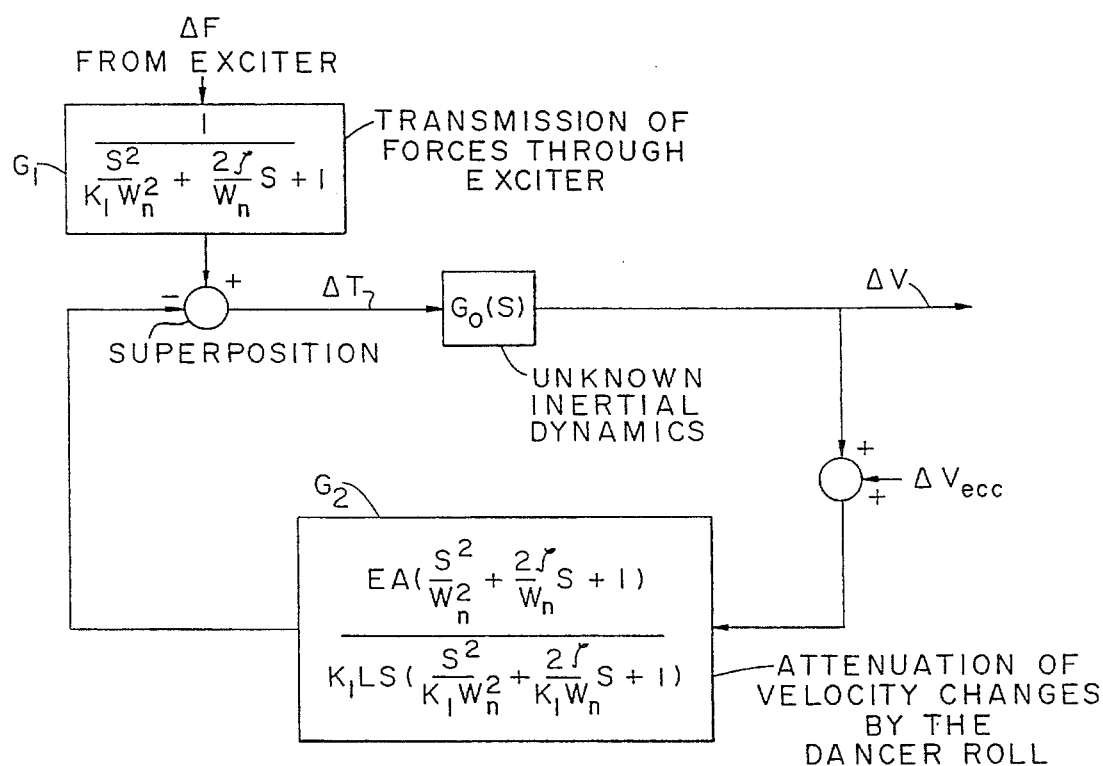

FIG. 6 is a graph that represents the natural frequency response of a typical exciter of FIG. 1. The quotient of exciter roll position divided by applied actuator force is plotted versus the frequency of application. The graph represents the expected movement in roll position (if the roll is not engaging the sheet) for a given applied force at any frequency;

FIG. 7 is a graph showing the attenuation of tension variations caused by strip velocity changes induced by an eccentric unwinding coil. The quotient of strip tension divided by strip velocity is plotted versus the frequency of the velocity changes. This Figure shows that there is a significant reduction in sensitivity for variations less than the natural frequency of the exciter; and FIG. 8 is a block diagram showing the total dynamics of a line handling a strip of metal, plastic, paper, or other web material under tension.

PREFERRED EMBODIMENTS

Referring now to FIG. 1 of the drawings, an "exciting" arrangement 10 is shown schematically (hereinafter referred to as a "tension exciter"). The tension exciter includes an actuator means 12 for translating a roll 14 in a vibratory manner and in an essentially perpendicular direction against a traveling strip or sheet of metal material 16. The tension exciter is based on a "dancer roll" concept that has been employed in the rolling industry to dampen sheet tension transients. The tension transients are absorbed or attenuated by the change in the roll position originally caused by the transients.

A sensor 18, such as a load cell, is shown located between roll 14 and actuator 12 for measuring the force which vibrates the dancer roll. Preferably, the actuator and load cell are housed in a structure 19 (in dash outline) that is transportable to a sheet line for insertion into and removal from the line. The sheet can be introduced to and received from dancer roll 14 respectively by rolls 20 and 22. Rolls 20 and 22 can be part of apparatus 10.

As further shown in FIG. 1, actuator 12 has a spring rate or constant $K_o$ that functions in terms of pound force per inch of spring movement. This "rate" is an important gain or constant in the transfer function that will be described below in connection with the dynamics that introduce variations into the tension of a traveling sheet of material.

Figure 2:
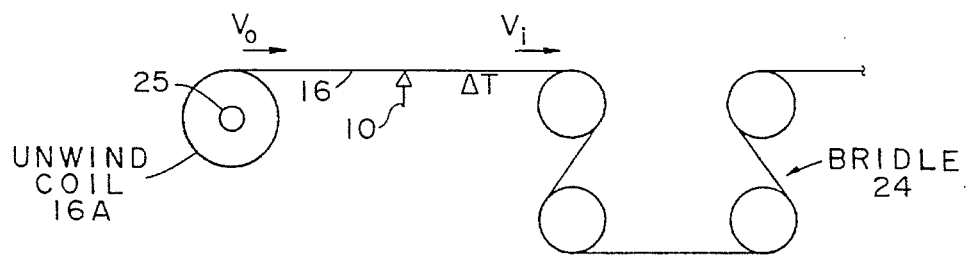
FIG. 2 is a schematic diagram of an unwind roll and the bridle before a leveler or rolling stand (not shown)

An approximate schematic model of a typical tension process is shown in FIG. 2. The exciter 10 of FIG. 1 is represented in FIG. 2 by an arrow 10 so as not to clutter the basic model of the figure. As shown in FIG. 2, the process involves a sheet material 16 being directed unwound and to bridle rolls 24 prior to a leveling apparatus (not shown). However, bridle rolls are not necessary for the invention to be effective. A bridle employs several rolls (24) that enable substantial increases in sheet tension to be developed through the process of wrapping the sheet around each of the rolls. The strip tension between the unwind and the bridle will be in steady state if the velocity $V_o$ at which the sheet leaves sheet material 16 is equal to the velocity $V_i$ at which the sheet enters bridle 24. If these velocities are not equal, then an increase or decrease in tension will occur, and the sheet will stretch, in the case of an increase in tension, according to Young's modulus. The sheet continues to stretch, i.e., its length continues to change ($\Delta L$) such that the velocity $V_o$ of the sheet leaving sheet material 16 is less than the velocity $V_i$ of sheet entering rolls 24. Thus, a change ($\Delta V$) in velocity causes a change in tension $\Delta T$ (FIGS. 2 and 3) in the traveling sheet. The changing tension and length interacts with the inertias of the process (i.e., the mass of sheet material 16, bearing friction in spool 25 containing the coil, and the bearings and inertias of rolls 24). These are depicted by the block $G_o(S)$ shown in FIG. 8 and by boxes 26 and 28 of FIG. 3 of the drawings. The interaction of $\Delta T$ and $\Delta V$ with the inertias of the apparatus force balances the mass flow of the sheet (the mass of the material being processed does not change) while serving to distribute the force/torque of the systems that drives sheet material 16 and rollers 24, as represented by 26 and 28 in FIG. 3.

Figure 3:
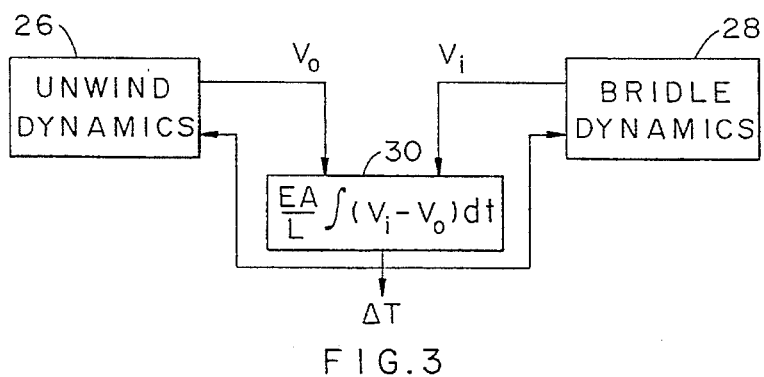
FIG. 3 is a model of tension dynamics that shows the coupling that occurs between velocity ($V_o$ and $V_i$) of the strip and strip tension.

In box 30 of FIG. 3, strip tension phenomenon is expressed as $$\frac{EA}{L} \int (V_i - V_o) dt \quad (1)$$

where

E is the Young's modulus of the material of strip 16;

A is the cross-sectional area of the strip (i.e., width times thickness); and

L is the length of the strip between a payoff coil and bridle 24.

The term $\int (V_i - V_o) dt$ in Equation (1) represents the change in metal length $\Delta L$ between coil 16A and the first roll of bridle 24 due to the sheet tension. The position of roll 14 (FIG. 1) at any point in time can be approximated by $\Delta x$; $\Delta x$ is roll movement in one direction; $2\Delta x$ signifies the additional distance that the strip must travel due to the movement of the roll.

Strip 16, in turn, experiences a change in tension $\Delta T$ that is expressed as follows:

$$\Delta T = \frac{EA}{L} [\int (V_1 - V_o) dt - 2\Delta x] \quad (2)$$

where the strip tension is in pounds of force. Strip tension is measured by an apparatus 31 in FIG. 1, which comprises a roll that engages the strip and a load cell mechanically connected to the roll. In place of 31, tension can be measured by one of the rolls 20 or 22 mounted on a load cell (not shown), or an additional roll associated with exciter 10, depending upon the sheet path entering or leaving the exciter.

Figure 4:
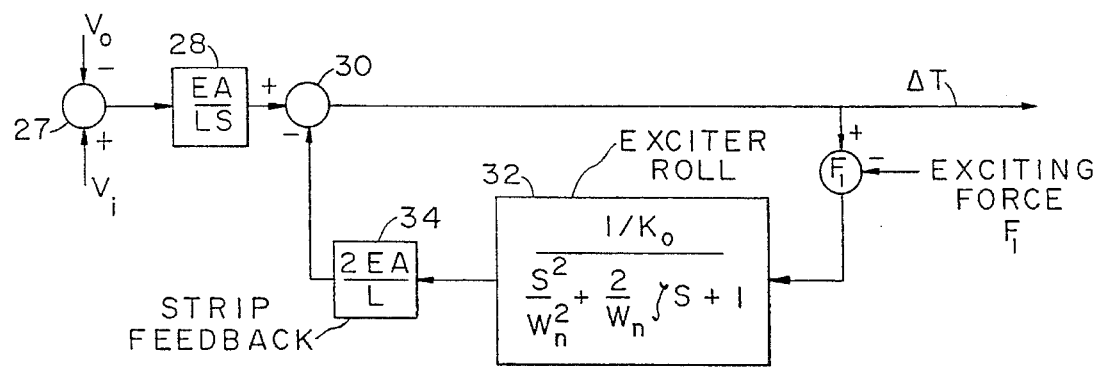
FIG. 4 is a block diagram of tension dynamics and typical differential equations in the Laplace transform format describing the dynamics (with S=Laplace Operator)
Figure 5:
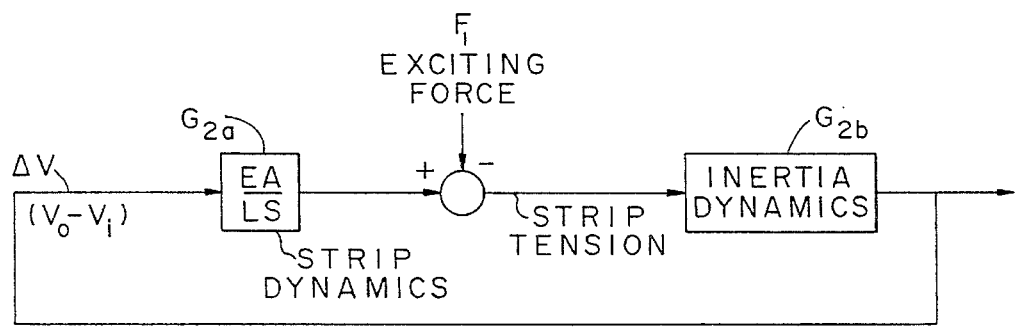
FIG. 5 is a block diagram of tension dynamics when the frequency of excitation is significantly less than the natural frequency of the exciting apparatus of FIG. 1.

The tension exciter 10 preferably operates at a higher frequency than the dynamics to be measured. As shown in FIG. 4, which is a model of roll 14 behavior, a force $F_1$ is introduced to a traveling strip by roll 14 such that the tension of the strip is upset to provide tension disturbances ($\Delta T$) that permit identification of dynamic tension elements in the strip. The tension influencing elements originate at specific locations in a rolling, winding, and/or levelling process so that steps can be taken to eliminate or at least reduce the cause of tension variations. The model of FIG. 4 involves the key measurements of applied force $F_1$, as sensed by load cell 18, strip tensions $\Delta T$ as sensed at 31 (FIG. 1), and any other process measurements that may be of interest.

In the model of FIG. 4, any difference in the velocities of sheet material 16 and bridle 24 (FIG. 2) are summed at 27. The sum is multiplied at 28 by EA/LS, EA/L being the effective spring constant of sheet material 16 and S being the Laplace Operator, which is introduced at 28. This operation represents the component of tension variation due to the stretch of the sheet, as described in Equations (1) and (2). The dynamic motion of the exciter roll (roll 14 in FIG. 1) is determined at 32 in FIG. 4. The resulting motion is multiplied by 2EA/L at 34 to produce an increase or decrease in strip tension due to the reaction of the tension exciter. The components of tension variation from 28 and 34 are combined at 30 to yield the total dynamic tension variation, as described by Equation (2). The roll dynamics, as described by the roll position $\Delta x$ (FIG. 1) and roll force $\Delta F$ (in lbs. force), can be approximated by the following differential equation:

$$\frac{\Delta F}{K_o} = \frac{d^2 x}{W_n^2 dt^2} = \frac{2\xi}{W_n} \frac{dx}{dt} + 1 \quad (3)$$

or in Laplace notation as:

$$\frac{\Delta X(S)}{\Delta F(S)} = \frac{1/K_o}{\frac{S^2}{W_n^2} + \frac{2\xi}{W_n} S + 1} \quad (4)$$

where $K_o$ is the spring rate of exciter 10;

$W_n$ is the natural frequency of exciter 10 in radians/second; (where $W_n$ is equal to $2\pi f_n$, and $f_n$ is the natural frequency of exciter 10 in hertz)

$\zeta$ is the damping ratio of the system of 10; and

S is the Laplace Operator.

FIG. 4 is the combination of Equations (2) and (4). The graph of FIG. 6 shows the natural frequency response of the exciter of the invention for a typical application and the expected movement of roll 14 for a given force applied by strip 16 against the roll at a given frequency.

The process shown in FIG. 4 can be reduced to the following Laplace transform relationship:

$$G_1 = \frac{\Delta T}{\Delta F} = \left[ \frac{2EA}{LK_o K_1} \right] \left[ \frac{1}{\frac{S^2}{K_1 W_n^2} + \frac{2\xi}{K_1 W_n} S + 1} \right] \equiv \quad (5)$$

-continued $$G_2 = \frac{\Delta T}{\Delta V} = \left[\frac{EA}{K_1 LS}\right] \left[\frac{\frac{S^2}{W_n^2} + \frac{2\xi}{W_n} S + 1}{\frac{S^2}{K_1 W_n^2} + \frac{2\xi}{K_1 W_n} S + 1}\right] \equiv \qquad (6)$$

$$\left[\frac{K_o}{2}\right] \left[\frac{\frac{S^2}{W_n^2} + \frac{2\xi}{W_n} S + 1}{\frac{S^2}{K_1 W_n^2} + \frac{2\xi}{K_1 W_n} S + 1}\right]$$

where $G_1$ is a dimensionless variable representing the transmission of force through exciter 10;

$G_2$ is a dimensionless variable representing the attenuation of strip velocity changes caused by exciter 10; and $$K_1 = 1 + \frac{2EA}{LK_o}$$

but with practical considerations:

$$K_1 = \frac{2EA}{LK_o} \text{ and } \frac{EA}{K_1 L} = \frac{K_o}{2}$$

It should be noted that the steady state sensitivity or gain of the strip process to velocity variations has been effectively reduced from EA/L to $K_o/2$ (i.e., to one-half of the natural spring rate of exciter 10) by the use of the exciter apparatus of the invention. This dramatic reduction in sensitivity to velocity changes is the motivation for the application of dancer rolls in strip handling processes; the graph of FIG. 7 shows the reductions for tension variations that are less than the natural frequency of exciter 10.

Equations (5) and (6) describe the propagation of tension and velocity variations by the exciter apparatus. An expanded analysis of the dynamics is shown in FIG. 8. The figure shows how a force from an exciter apparatus interacts with other dynamic components in the strip handling process. In reference to FIG. 8:

$$\frac{\Delta T}{\Delta F} = \frac{G_1}{1 + G_o G_2} \qquad (7)$$

where $G_o$ is a dimensionless variable that represents the unknown dynamics of the process that relate a change in velocity to a change in tension.

FIG. 8 and Equation (7) thus summarize the dynamic structure of the exciting process in which a disturbance introduced by exciter 10 becomes a variation in strip tension. The nature of the disturbance can be sinusoidal, a step change, psuedo random, etc.

As an example of the use of the exciter apparatus of the invention to identify process dynamics, consider a sinusoidal variation in force, $\Delta F$, applied against a traveling strip of material (16). The sinusoidal $\Delta F$ introduces a sinusoidal reaction in strip tension, $\Delta T$. Likewise, bridle rolls 24, a leveler process, etc., will transmit the frequency of the sinusoidal tension variation. The response of the process described by Equation (7) can be measured by the ratio of the amplitude of the variation, i.e., the quotient of ($\Delta T$) divided by ($\Delta F$), and the phase shift between these sinusoidal variations. This process would be repeated at various frequencies of excitation to experimentally generate a function $\Delta T/\Delta F$. The unknown process response ($G_o$) can be computed by solving Equation (7) as:

$$G_o(j2\pi f) \cong \frac{G_1(j2\pi f) - (\Delta T/\Delta F)e^{+j\theta}}{G_2(j2\pi f)(\Delta T/\Delta F)e^{+j\theta}} \qquad (8)$$

where a complex variable form is used with $j2\pi f = S$, and $\theta$ is the phase shift at the frequency f in radians/second. For the case where the frequency of excitation is significantly less than the natural frequency of the tension exciter:

$$G_o(j2\pi f) \cong \frac{[1 - (\Delta T/\Delta F)e^{+j\theta}]}{(K_o/2)S(\Delta T/\Delta F)e^{+j\theta}} \qquad (9)$$

The function $\Delta T/\Delta F$ can be identified by other methods, for example, by psuedo-random excitation and time series analysis. Equations (8) and (9) apply to the estimation of $G_o$. $G_o$ is defined in reference to Equation (7).

When summarized as a function of frequency, the data obtained by the sensor at 31 describes the frequency response, attenuation, or amplification of the tension variations. The outputs of sensors 18 and 31 can be processed by a general purpose digital computer (not shown), including computation of the transfer function for the differential equations that approximate the process.

While the invention has been described in terms of preferred embodiments, the claims appended hereto are intended to encompass all embodiments which fall within the spirit of the invention.

What is claimed is:

1. A method of processing sheet metal having a certain modulus in a process using apparatus having a natural frequency and rotating components that have certain inertias, with tension changes in the sheet material propagating upstream and/or downstream from the location of the occurrence of the tension changes, the sheet metal having a mass flow balance as it travels through the process, the method comprising:

momentarily upsetting the mass flow balance of the sheet metal by means that introduces tension changes in the sheet metal at a location at which the metal is otherwise unsupported in its travel through the apparatus and process to determine the existence of any amplification of tension change occurring through the relationship of the mass flow of the sheet metal to sheet tension, the means for introducing tension changes having a known spring rate, describing said tension changes as a function of time and frequency, relating tension changes occurring in an upstream or downstream location of the process to another upstream or downstream location, and including as operating parameters of the relationship between mass flow and tension (1) the sheet metal modulus, (2) the inertia of the rotating components, (3) the spring rate of the means employed to introduce tension changes in the sheet metal, and (4) the natural frequency of the apparatus, measuring the forces at which the tension changes in the sheet metal are momentarily introduced with a sensor that provides signals representing said forces, measuring tension changes in the sheet metal with a second sensor that provides signals containing a plurality of frequencies representing a plurality of sheet tension changes propagating upstream and/or downstream from the location at which the tension changes are introduced, analyzing the signals from said sensors to determine the influence of the above-named parameters on the relationship between mass flow and tension, and using such determination to identify one or more of the rotating components of the apparatus contributing to tension changes.

* * * * *